United States Patent Office 3,072,278
Patented Jan. 8, 1963

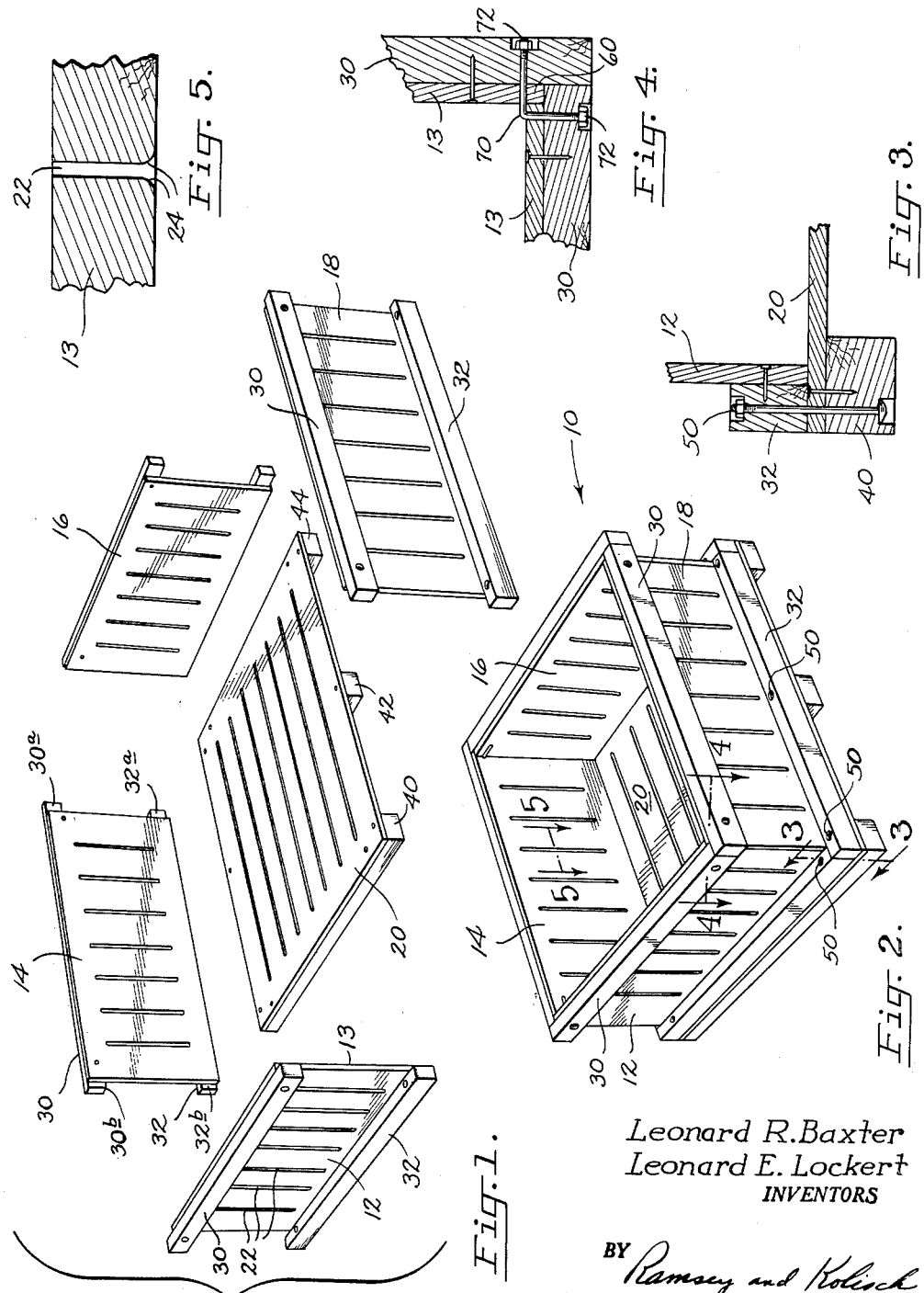

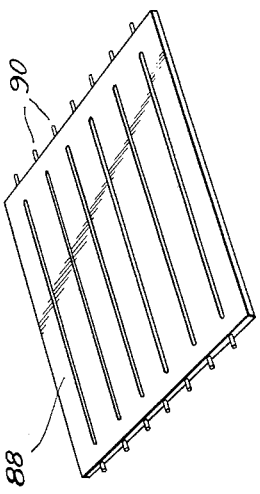
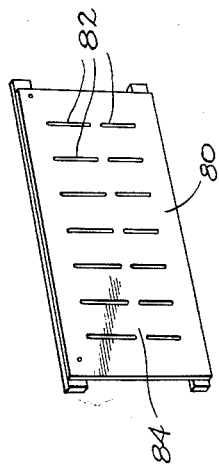
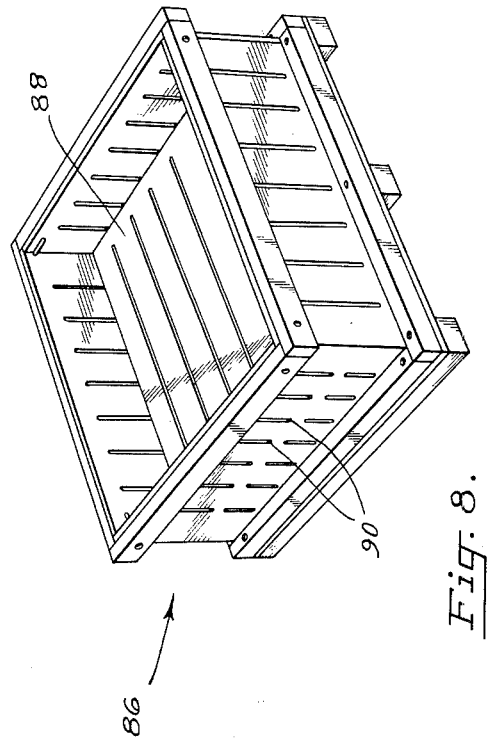

3,072,278
BOX CONSTRUCTION
Leonard R. Baxter and Leonard E. Lockert, Portland, Oreg.; said Lockert assignor to said Baxter
Filed Mar. 2, 1959, Ser. No. 796,458
3 Claims. (Cl. 217—12)

This invention relates to a novel box construction, and more particularly to a novel construction for a tote box, of the sort that may be used for carrying a number of loose articles deposited therein.

The box of this invention has particular utility in connection with the handling of fruits and vegetables. Thus the box may be placed out in the field, and fruits and vegetables deposited therein after harvesting them. The box is discussed below with reference to its use as a produce carrying box, although the box may have value in other uses.

It is customary in the harvesting of fruits and vegetables, or in the other handling of these items such as their storage, to place the items in a relatively large box. These boxes in the past generally have been made of wooden slats, arranged either up and down or from side to side along the sides of the box, with the slats spaced a slight distance apart to accommodate the passage of air through the box walls. This ventilation is important, since the decomposition which occurs in the ordinary fruit or vegetable tends to produce a rise in temperature, which if not taken care of would cause excessive damaging of the produce. The ventilation slots also serve a useful purpose during the storage of produce, in that the free passage of air through the box walls permitted by the slots lessens the time required to bring the produce down to proper storage temperature. More recently, storage techniques have been devised which use decay resisting gases circulated through the produce, and the ventilation slots thus find importance in connection with this type of storage.

A box construction utilizing a series of slats tends to be relatively weak and susceptible to inadvertent damage. Suitable bracing could overcome this structural weakness. However the materials required for such bracing are expensive, and add materially to the weight and mass taken up by the box itself.

In general terms, the box of this invention features side walls and a base each of which is made of one unitary panel, preferably a plywood panel. Each of the panels has extending between opposite side edges thereof plural elongated slots arranged side by side. These slots function as ventilating apertures in the box. The slots terminate short of the edges of the panel, thus to leave around the panel a continuous margin. Each panel, therefore, is a rigid unit, even though it contains lines of division defining separate panel portions in the center of the panel. The panels retain their original outline during use, without the tendency found in former boxes of their edges shifting relative to each other.

The panels in a completed box keep the sides of the box spaced apart and truly vertical, with the box thus always assuming a truly rectangular shape.

A feature of the invention is a construction wherein the box is readily disassembled into a plural number of relatively flat components which are easily stored. Thus the box comprises a separable base panel, and means for connecting to the base panel the side panels. The side panels are fastened to the top of the base panel slightly inwardly from the edges of the base panel, which enables the inclusion of a bracing strip along the base of each side panel that may be used in making the connection with the base panel. The base panel itself is provided with additional bracing strips on the under side thereof, and these various bracing strips are detachably secured together when assembling a complete box.

Along the upper edges of the side panels are elongated bracing strips or members, which are detachably secured end to end on assembly of the box. After connection of these upper bracing strips, a rigid collar is formed which performs the function of maintaining the sides rigidly in place, and also providing a broad support for the placement of an additional box thereover. The overlap of the ends is such that progressing in one direction around the perimeter of the box, each preceding bracing strip overlaps the one succeeding it. The panels to which the bracing strips are attached are overlapped in the same manner. In this way a stagger-type of joint is formed at the box corners. The joint is held together by a novel fastening member which draws the bracing strips and panels at each corner snugly together.

It is contemplated that the slots formed in each panel be defined by edges which are rounded on the inside of the panel. This reduces damage to fruit. Slots are used instead of holes or other perforations, as it has been found that in this manner, with the average sized produce, a greater proportion of opening can be made in the side of the box, with minimal chance of the fruit or produce coming into direct contact with the edges defining the opening. In view of the arrangement of the slots, the use of plywood panels for the base and sides of the boxes is advantageous, as the laminated structure of plywood withstands stresses exerted in multiple directions.

Other features and advantages of the invention will become apparent as the following description is read in conjunction with the accompanying drawings, wherein:

FIG. 1 illustrates, in perspective, the components of a box constructed according to this invention, with the components separated from each other and set apart to show how the box may be broken down;

FIG. 2 illustrates, in perspective, an assembled box;

FIG. 3 is an enlarged section view along the line 3—3 of FIG. 2, illustrating the connection for the base edges of the side panels with the bottom panel for the box;

FIG. 4 is an enlarged section view taken along the line 4—4 in FIG. 2, showing a connection at the upper corners of the box;

FIG. 5 is an enlarged section view along the line 5—5 of FIG. 2, showing the shape of the edges defining the slots in the box; and FIGS. 6, 7 and 8 illustrate a box and components therefor constructed according to a modification of the invention.

Referring now to the drawings, and more particularly to FIGS. 1 and 2, 10 indicates generally the completed box. The box shown is rectangular in shape, and comprises four vertical side walls, indicated at 12, 14, 16, and 18, and a base 20.

Each of the side walls and the base comprises a unitary plywood panel, which is separate and distinct from the panels making up the remainder of the box. As can be seen in FIG. 1, and with reference to side wall 12, a rectangular panel 13 is used, and this has formed therein a plural number of elongated cuts or slots indicated at 22. These extend across the panel between oppositely disposed top and bottom edges. The slots, however, terminate short of the edges of the panel, thus to leave around the panel a continuous margin. This continuous margin of cross bonded veneer imparts rigidity to the side of the box and prevents distortion from occurring. In the usual instance, using three ply, ⅝ inch plywood, the slots may extend to within about two or three inches of the panel edges, and be set some five to seven inches apart. This gives adequate ventilation, without unduly weakening the box.

As can be seen with respect to FIG. 5, the edges which define slots 22 on the inside surface of each panel 13 are rounded as at 24. Many types of fruit are easily bruised, especially if subjected to pressure, and the rounded edges prevent excessive creasing and cutting of fruit.

Each of the side walls includes, in addition to a panel portion, an upper and a lower brace member or strip, indicated at 30 and 32, respecitvely. The brace members are set parallel to each other, and extend across the panel directly adjacent the upper and lower edges of the panel. The brace members at each end overlap the side edges of the panel. It will be noted, however, that the overlap at one end of each brace member is in excess of the overlap of the other end. Thus, considering side wall 14, overlap 30a and 32a exceeds overlap 30b and 32b.

Each of the brace members is secured along its length to a panel, as by nailing and the like. The brace members thus are permanently joined to a panel, and act to make such panel rigid.

The panel of base 20, like the panels of the side walls 12 to 18, has elongated cuts made therein extending between opposite edges but terminating short thereof. The spacing of the cuts may be the same as in the side walls. Beneath panel of base 20 are three brace members 40, 42, 44, which function to space the base panel from the floor, and to provide a means for air to circulate up through the slots of the panel. These brace members also facilitate lifting of the box by a fork lift truck. The brace members 40, 42, 44 also are used in connecting the side walls in place. The members 40, 42, 44 are secured to the panel of base 20.

In assembling the completed box, side walls 12, 14, 16, and 18 are set on top of base 20, with the panels of these side walls extending vertically upwardly and disposed slightly inwardly from the edges of base 20. The outer sides of the brace members along the lower edges of side walls 12 to 18 are flush with the peripheral edge of base 20, as shown in FIG. 2. These lower brace members are then detachably secured to the panel by nut and bolt connections indicated at 50 (see FIG. 3). It will be noted that each of the nut and bolt connections extend through a brace member affixed both to a side wall and to base 20. Thus a firm connection is produced.

The upper edges of the various side walls are connected by connecting together the ends of the brace members which are disposed along these upper edges. These brace members, when connected, form a rigid collar surrounding the perimeter of the box.

Specifically, with reference now to FIG. 4, at each corner of the box the panel of one side wall overlaps the edge of the panel of the adjacent side wall, as at portion 60. The ends of the brace members also overlap in the same direction. Thus the end of the brace member affixed to the panel having overlap 60 in FIG. 4 overlaps the end of the brace affixed to the underlapping panel. In this way, when the corner is formed, the ends of the various parts are staggered.

Progressing around the perimeter of the box in a clockwise direction (referring now to FIG. 2) the ends of the upper and lower brace members of a preceding side wall overlap the ends of the upper and lower brace members of a succeeding side wall. Thus, for any given side wall, the relationship of the various parts making the corners at opposite ends of the side wall is exactly opposite. By this construction, none of the brace members around the upper edges of the box act completely as bounding members, and none of them are completely bounded by other brace members.

Referring again to FIG. 4, connecting the overlapped ends of the brace members is an elongated, L-shaped fastening member or bolt 70. One leg of the bolt projects normally through the underlapping panel of the lower side wall in FIG. 4 at a point spaced slightly inwardly from the edge thereof. The spacing is necessary to prevent the bolt from tearing out of the panel. The other leg of the bolt extends for a portion of its length adjacent and parallel to the face of this underlapping panel toward the other of the panels (which is the overlapping panel) and thence extends normally through the overlapping panel and through the brace member which is affixed to this overlapping panel. The width of the underlapping panel spaces this other leg inwardly from the edge of the overlapping panel a sufficient distance to prevent breakout. When nuts, indicated at 72, are tightened on the legs of bolt 70, the underlapping panel is pulled toward the overlapping panel, and a tension is set up in the panel. Since the overlap of successive brace members is the same progressing in one direction around the box, as already discussed, each of the panels of the box side walls is subjected to this tensioning. Further, each of the side walls has corner edges which are connected in the same manner as the remainder of the side walls.

In FIGS. 6, 7 and 8, a modification of the invention is illustrated. In this form of a box, a divider panel is incorporated which separates the box into upper and lower halves. Produce which is easily damaged when subjected to pressure, such as peaches, apricots, and the like, are readily stored in this box with the divider panel relieving the load on the lower layer of fruit. While one divider panel is illustrated and discussed in connection with the modification, obviously two or more could be used in a similar manner.

Referring now to these figures, two of the side wall panels for the box, represented by panel 80 in FIG. 6, has cuts 82 formed therein which extend between opposite edges. These are not continuous, but are interrupted intermediate their ends. There is present in the panel a continuous web of wood 84 extending between opposite side edges of the panel approximately centrally of the top and bottom edges. The completed box 86 of FIG. 8 has a pair of opposite side walls wherein the panels for the walls are formed as in FIG. 6. The remainder of the side walls may be made according to the manner of the first embodiment discussed.

Adapted to be fitted within the interior of box 86 is a divider panel 88. This divider panel may also be made of plywood, and has outer dimensions which enable it loosely to be fitted within the interior of box 86. Imbedded in opposite edges of panel 88 are a series of dowel pin 90. The ends of these pins protrude outwardly from the edges of the panel a distance equal approximately to the width of the panels making up the side walls of the box. These dowel pins have diameters which enable them to be fitted within cuts or slots 82.

In filling a box such as box 86, the bottom of the box is first loaded with fruit, up to the level approximately of the lower ends of the upper series of slots 82. These lower ends are disposed along a horizontal line. Panel 88 is then slipped into the box, with the dowel pins along one edge inserted through the upper series of slots 82. The other edge of the panel may then be dropped into place, with the dowel pins along this edge fitting within similar slots formed in the opposite side wall panel. The dowel pins come to rest on the bottoms of the various slots and hold the panel in a horizontal plane. This panel may then be loaded with fruit, and the box entirely filled.

The box construction hereinabove described is readily disassembled for storage. The box is ideally suited for transporting produce over long distances, as disassembly of the box lowers the cost of returning the box to its point of origin. Structural grade materials may be used in the manufacture of the box, and thus the box is relatively economical to produce. Most important, the box is strong and rigid when assembled. A box can be manufactured from ⅝ inch, three ply plywood which will hold from 1,000 to 1,500 or more pounds of produce without danger of breaking apart, even when stacked four or six deep while so loaded.

It is claimed and desired to secure by Letters Patent:

1. A tote box construction capable of disassembly comprising a rectangular plywood base panel and four rectangular plywood side wall panels making up the sides of the box, each of the aforementioned panels being a unitary plywood piece of cross bonded veneer and separable from the other panels, said base and side wall panels having elongated slots formed therein, said slots terminating short of the edges of the respective panels to leave continuous outer margins extending about the perimeters of the panels, each of said side wall panels extending substantially parallel to an edge of the base panel and projecting upwardly therefrom and being disposed slightly inwardly from the edge, brace members disposed horizontally along the top and bottom edges of each of the side wall panels and affixed along their lengths to the continuous outer margin of the panel, the brace members along the bottom edges of the side wall panels occupying a superimposed position over marginal portions of the base panel, a brace member fixed along each of opposite sides of the base panel and arranged at right angles to the slots therein, the last-named brace member constituting skid members, elongated fastener means extending through the brace members along the bottom edges of the side wall panels and the brace members of the base panel detachably securing these brace members in place, and elongated fastener means extending through adjacent ends of the brace members along the top edges of the side wall panels thus detachably to secure these ends together.

2. The construction of claim 1 wherein, progressing in one direction around the perimeter of the box, the brace members along the top edges of the side wall panels are disposed at the corners of the box with an end of the brace member of a preceding panel overlapping an end of the brace member of a succeeding panel, such end of the succeeding panel being an underlapping end, and wherein the panels themselves at the corners of the box are similarly disposed, with an edge of a preceding panel overlapping an edge of a succeeding panel, such an edge of the succeeding panel being an underlapping edge, and wherein the fastener means extending through the brace members along the top edges of the side wall panels are elongated, L-shaped fastening members with two legs, each fastening member being positioned at a corner of the box with one leg parallel to and inwardly of the inner face of the side wall panel with the underlapping edge and its other leg extending at right angles through the side wall panel with the underlapping edge at a point spaced a short distance inwardly from its edge.

3. The construction of claim 1 which further comprises a divider panel separable from the remainder of the box disposed substantially parallel to the base panel but mounted in spaced relation thereabove, and wherein the slots of at least two oppositely disposed side wall panels include slots extending in a vertical direction and terminating at locations defining a horizontal plane spaced above said base panel, and wherein the divider panel is mounted in the box by means inserted through said vertical slots of said two panels and resting on the lower ends of said vertical slots.

References Cited in the file of this patent
UNITED STATES PATENTS

| | | |
|---|---|---|
| 258,220 | Cochrane | May 23, 1882 |
| 632,135 | Miller et al. | Aug. 29, 1899 |
| 718,616 | Gale | Jan. 20, 1903 |
| 929,894 | Strassel | Aug. 3, 1909 |
| 1,094,463 | Munchausen | Apr. 28, 1914 |
| 1,148,372 | Fenlason | July 27, 1915 |
| 2,064,518 | Brogden | Dec. 15, 1936 |
| 2,124,217 | Van Benschoten | July 19, 1938 |
| 2,801,742 | Farrell | Aug. 6, 1957 |
| 2,890,809 | Poley | June 16, 1959 |

FOREIGN PATENTS

| | | |
|---|---|---|
| 611,544 | Great Britain | Nov. 1, 1948 |